UNITED STATES PATENT OFFICE.

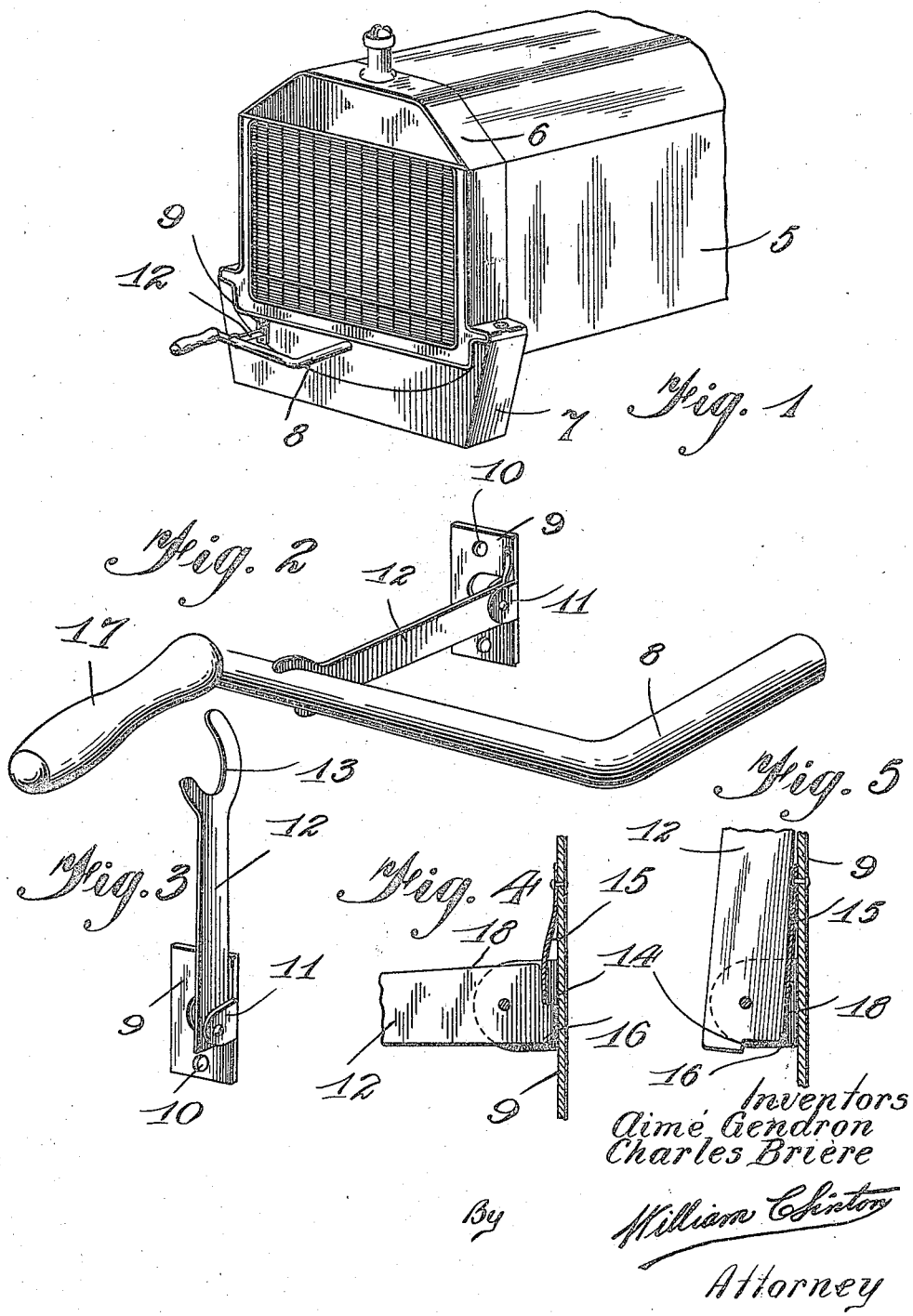

AIMÉ GENDRON, OF MONTREAL, AND CHARLES BRIÈRE, OF BEAUHARNOIS, QUEBEC, CANADA.

CRANK-HOLDING ATTACHMENT.

1,424,894.   Specification of Letters Patent.   Patented Aug. 8, 1922.

Application filed February 17, 1921. Serial No. 445,789.

*To all whom it may concern:*

Be it known that we, AIMÉ GENDRON and CHARLES BRIÈRE, both subjects of the King of Great Britain, residing at Montreal and Beauharnois, respectively, in the Province of Quebec, Canada, have invented certain new and useful Improvements in Crank-Holding Attachments, and do hereby declare that the following is a full, clear, and exact description of the invention, such as will enable others skilled in the art to which it appertains to make and use the same.

The present invention relates to new and useful improvements in a crank holding attachment for automobiles and the like.

The primary object of the invention is the provision of an attachment for automobiles, whereby the cranks thereof will be supported against any undesired rattling.

Another object of the invention is the provision of an attachment for automobiles including a spring actuated arm, designed to hold the starting crank in such position so as to prevent rattling, yet permitting its ready release when it is desired to start the engine by cranking.

Another object of the invention is the provision of means for retaining the said crank supporting arm in an inoperative position out of the path of the crank, when the latter is being used.

A still further object of the invention is the provision of a device of the above specified type, which will be comparatively simple and inexpensive to manufacture, reliable and efficient in use, and readily operated.

With the above and other objects in view, the present invention resides in the novel features of construction, formation, combination, and arrangement of parts to be hereinafter more fully described, claimed, and illustrated in the accompanying drawings forming a part of the present application; and in which, Figure 1 is a perspective view of the forward portion of an automobile or the like showing the attachment applied thereto and supporting the starting crank in inoperative position;

Figure 2 is an enlarged perspective view of the attachment removed;

Figure 3 is a view similar to Figure 2 showing the device in inoperative position;

Figure 4 is a longitudinal sectional view taken through the device showing it in operative position, with parts broken away;

Figure 5 is a similar view showing the arm in inoperative position.

Referring now to the accompanying drawings by corresponding characters of reference, the number 5 designates in general the forward portion of an automobile, including the radiator 6, a frame 7 and starting crank 8.

A plate 9 is secured as at 10 to the forward end of the machine to one side of the starting crank 8, and is provided with a pair of ears 11 arranged in spaced relation, as clearly shown in the drawings, and between which is pivoted a supporting arm 12, for vertical swinging movement.

The forward end of the arm 12, is forked as shown at 13 to engage the crank 8 adjacent its handle, for supporting the latter in the positions shown in Figures 1 and 2 of the drawings.

The inner end of the arm 12 is notched as shown at 14 for engagement with a spring 15 by means of which the said arm is normally held in a horizontal position, allowing however, a slight flexible movement of the crank. The lower rear end portion of the arm 12 is rounded as shown at 16 and is designed to engage the plate 9 to prevent any undesired downward displacement of the arm, which would have a tendency to release the crank.

When it is desired to crank the machine the handle 17 is given a quick upward movement which releases the crank 8 from the forked end of the arm 12, throwing the said arm to vertical position in which position it is held by the spring 15, which engages the flat side 18 thereof, as clearly shown in Figure 5, thus retaining the arm in inoperative position preventing any interference with the cranking of the machine.

From the foregoing description taken in connection with the accompanying drawings, it will be manifest that a crank supporting device, for automobiles and the like is provided which will fulfil all of the necessary requirements of such a device, and while the said device is adapted particularly for Ford cars, it is to be understood that they can be used for any other make of machine desired, or upon any device to which the various parts adapt themselves and it should be further understood in this connection, that various minor changes in the specific details of construction can be resorted to without departing from the spirit or sacrificing any of the advantages of the invention.

Having thus fully described our invention, what we claim as new and desire to secure by Letters Patent is:

1. A device of the character described, including a plate, ears extending from said plate, an arm pivoted between said ears, a forked terminal provided upon said arm and a spring attached to the plate for engaging said arm and retaining the same in operative and inoperative positions.

2. A device of the character described, including a plate, said plate having ears formed integral thereon, and arranged in spaced vertical relation, an arm pivoted between said ears, the other end of the said arm being forked, the pivoted end of said arm having a notch therein and a spring attached to the plate and engaging said notch for retaining the plate yieldingly in horizontal position, said spring adapted to engage the sides of said arm for retaining the latter in vertical position, substantially as and for the purposes set forth.

In witness whereof we have hereunto set our hands.

AIMÉ GENDRON.
CHARLES BRIÈRE.